(12) United States Patent
Crean et al.

(10) Patent No.: US 8,670,154 B2
(45) Date of Patent: Mar. 11, 2014

(54) DATA ARCHITECTURE FOR MIXED RESOLUTION INTERLEAVED CROSS-CHANNEL DATA FLOW AND FORMAT

(75) Inventors: Peter A. Crean, Webster, NY (US); Robert Paul Loce, Webster, NY (US); Raymond J. Clark, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 322 days.

(21) Appl. No.: 13/113,647

(22) Filed: May 23, 2011

(65) Prior Publication Data

US 2012/0274955 A1 Nov. 1, 2012

Related U.S. Application Data

(60) Provisional application No. 61/480,100, filed on Apr. 28, 2011.

(51) Int. Cl.
*G06K 1/00* (2006.01)
*G06K 9/00* (2006.01)
*H04N 5/232* (2006.01)

(52) U.S. Cl.
USPC .......... 358/1.9; 358/1.15; 358/3.01; 358/504; 382/162; 382/166; 382/167; 348/211.5

(58) Field of Classification Search
None
See application file for complete search history.

(56) References Cited

U.S. PATENT DOCUMENTS

| | | | | |
|---|---|---|---|---|
| 5,477,345 A * | 12/1995 | Tse | | 358/500 |
| 5,960,161 A * | 9/1999 | Bloomberg et al. | | 358/1.9 |
| 6,943,799 B2 * | 9/2005 | Vorst | | 345/539 |
| 7,003,585 B2 | 2/2006 | Phong et al. | | |
| 7,352,374 B2 * | 4/2008 | Brown Elliott et al. | | 345/613 |
| 7,853,074 B2 * | 12/2010 | Mischler | | 382/163 |
| 2001/0040599 A1 * | 11/2001 | Dunand | | 347/16 |
| 2002/0118374 A1 * | 8/2002 | Wanko | | 358/1.2 |
| 2007/0177231 A1 | 8/2007 | Wang et al. | | |
| 2009/0279111 A1 | 11/2009 | Bala et al. | | |
| 2010/0103440 A1 | 4/2010 | Crean et al. | | |

* cited by examiner

*Primary Examiner* — Steven Kau
(74) *Attorney, Agent, or Firm* — Fay Sharpe LLP (57) ABSTRACT

The present application provides a mixed resolution, interleaving-based, cross-channel data flow and data format for a printer image path. The architecture provides pixel data for a colorant of a given writing channel at its nominal (full) resolution, while pixel data for other colorants is provided at lowered resolution. Pixel data for a primary channel at its full resolution is interleaved with data for other secondary channels at lower resolution. Known sub-sampling or compression techniques can be used to lower the resolution of the secondary channels. The data at the different resolutions is generated by the digital front end (DFE), which distributes the data for each writing channel at the time it is needed. Preferably, the low resolution data is sent first to the writer, followed by high resolution data, so that data buffering is minimized.

22 Claims, 4 Drawing Sheets

DATA ARCHITECTURE FOR MIXED RESOLUTION INTERLEAVED CROSS-CHANNEL DATA FLOW AND FORMAT

This application claims the priority benefit of U.S. provisional patent application Ser. No. 61/480,100, filed Apr. 28, 2011, the disclosure of which is incorporated herein by reference.

BACKGROUND

The present disclosure relates to image separation based multicolor document processing systems such as printers, copiers, multi-function devices, etc. and to control techniques for operating the same.

Real-time contone image paths operate only on individual image separations. Individual image separations divide a color image into at least the primary colors cyan, magenta, yellow and black.

System performance requirements and technology limitations have driven the printing industry to leverage the natural parallelism suggested by marking engine separations, utilizing independent communications channels to independent marking modules for each separation. That is, there is a primary marking engine for each of cyan, magenta, yellow and black. However, it has been found that the consideration of what other local colors are to be printed at a location, can improve print quality by the marking engine when printing its primary color. Such real-time controls within an image path have been shown to be beneficial in maintaining image quality, however the data isolation from such independent channels has bandwidth requirements which practically preclude processing calculations involving multiple color separations. A system needing to perform calculations using multiple image separations would need to incorporate a sophisticated memory sub-system, capable of providing the bandwidth required to bring the separations together in both time and space in the print engine. However, such a sub-system may incrementally increase costs and complexity. In addition to the memory components themselves, such a sub-system requires extensive control and data path functionality to effect the flows in and out, and a mechanism to enable the multiple flows to share the single memory. While the cost of the memory components has become much smaller and the cost of the considerable supporting logic is also dropping, the architectural and design complexity, board space, and power consumed are major incremental expenses unless there is some other reason to provide this buffering.

If such a memory buffer is already present in the design for some other purpose, leveraging it to enable cross-separation processing may dramatically increase the bandwidth or size requirements, and so its cost and complexity.

Cross separation calculations however may not require the full resolution of all separations. Low resolution separations of secondary colors use less memory than a full resolution separation of a primary color. Transmitting and storing only the low resolution data to a working engine prior to the cross separation calculation could allow the nominal full resolution data to be passed in real time without consuming buffer memory, resulting in less communication bandwidth and less memory use for the entire system. Less data communicated and less data stored results in less design time, less product cost, a smaller product, and a more reliable and efficient system.

One approach is presented in U.S. Patent Application Publication No. US2010-0103440 A1 by Crean, titled "Image Path Utilizing Sub-Sampled Cross-Channel Image Values" which is incorporated herein by reference in its entirety. This method and a system processes digital images using multi colorants and multiplexed sub-sampling. One color is retained at full nominal resolution and the remaining colors are sub-sampled. The full resolution nominal color values are used to search a lookup table based on known printing processes to normalize the sub-sampled colorants and produce desired output values. The drawback in such a technique is that the use of such a lookup table itself uses memory to store look-up data and to perform calculations using the complex formulas as featured in the U.S. Patent Application Publication No. US2010-0103440 A1. What is needed in the art is a means for producing the desired color pixel output result employing a multiplexing and sub-sampling solution without intensive memory requirements.

Accordingly, a need remains in the art for improved printing in high resolution which uses less buffer capacity and operates in a faster and cost effective manner. The present application presents such a system and method.

BRIEF DESCRIPTION

The subject embodiments concern a system of communicating multiple separations of image pixel data in an interleaved data flow containing one or more full bandwidth primary separations and one or more lower bandwidth secondary separations so as to enable the receiving system to perform calculations combining local information with the primary separations in the context of the secondary separations, but where only secondary separations are buffered prior to the cross separation calculations.

An efficient data flow and data format has the features of a high and low resolution image separations generated in a DFE (Digital Front End). The DFE distributes the data for each marking channel when it is needed. Sub-sampled separation data for cross-channels of secondary colors is interleaved with the full resolution image data of the primary color. The low resolution data can be sent first and buffered so that high resolution data can be processed and printed as soon as it is received (i.e., in real-time). The key benefit of this approach is that data buffering is minimized. This reduces the amount of buffer memory required to process high resolution data processing. The reduction in memory required reduces the cost associated with performing high resolution cross-separation image processing. The data flow can be a natural extension of multi-mode or mixed resolution image encoding formats, where the primary separation data required by a given marking channel in the print engine is sent at full resolution, and the novel addition sends sub-samples of the other separations which are secondary information for that marking channel.

The subject embodiments disclose a color document processing system and method which incorporate a data extraction component, full resolution primary separations, a sub-sampler for receiving primary separations and outputting lower resolution secondary separations, and a plurality of multi-separation processors outputting modified full resolution versions of the primary separations for marking. The color image is initially separated into full resolution separations of two or more colors. The color separation to be marked by a given marking channel is sent directly to a multi-separation processor. All separations are sent to a common sub-sampler, where they are processed to a lower resolution. The resulting low resolution sub-sampled separations are sent to the marking channels where they are needed by the multi-separation processors for calculations, but where they will not be marked. The multi-separation processors combine the full resolution primary separations and the sub-sampled secondary separations to produce an output of color pixels for direct display or marking on a substrate.

In certain embodiments, the method enables the use of four color separations of cyan, magenta, yellow and black. In other embodiments, fewer colors may be used. In other embodiments, more colors may be used. In still further embodiments, four colors other than cyan, magenta, yellow or black may be used.

A separate system is disclosed which encloses the sub-sampler and multiplexer into an extraction and alignment component. In certain embodiments, the system will use one nominal color and sub-sample all other colors. In further embodiments, two or more colors may be nominal colors with fewer sub-sampled colors. In other embodiments, four colors of cyan, magenta, yellow and black may be used. In further embodiments, more colors may be used, or even fewer than four colors may be used, or four different colors may be used.

BRIEF DESCRIPTION OF THE DRAWINGS

The present subject matter may take form in various components and arrangements of components, and in various steps and arrangement of steps. The drawings are only for purposes of illustrating preferred embodiments and are not to be construed as limiting the subject matter in which.

DETAILED DESCRIPTION

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. Certain embodiments are illustrated and described below in the context of exemplary multi-color document processing systems that employ multiple xerographic marking devices or stations in which toner marking material is first transferred to an intermediate structure and ultimately transferred to a final print medium to create images thereon in accordance with a print job. However, the techniques and systems of the present disclosure may be implemented in other forms of document processing or printing systems that employ any form of marking materials and techniques in which marking device fields are used for material transfer, such as ink-based printers, etc., wherein any such implementations and variations thereof are contemplated as falling within the scope of the present disclosure.

Figure 1:
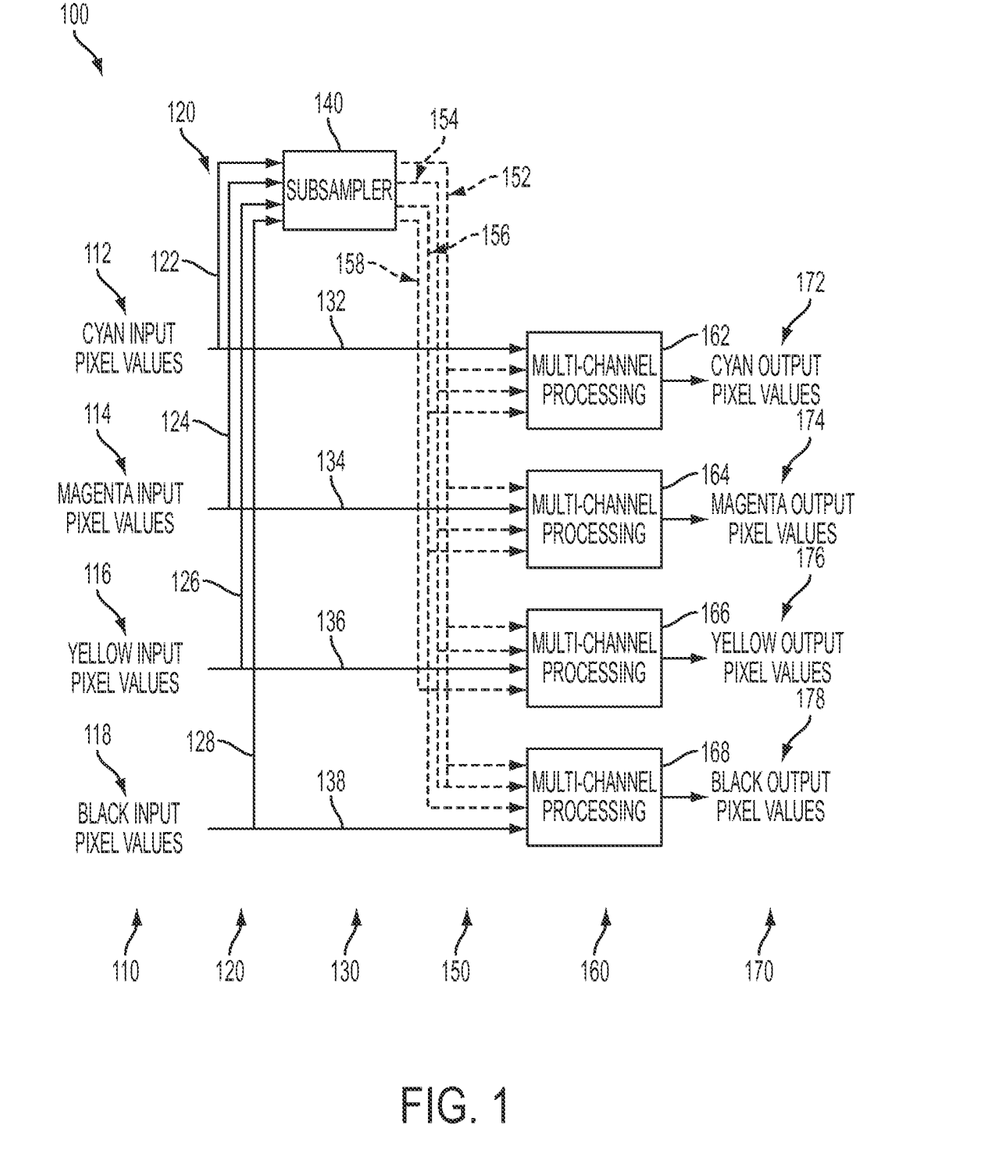
FIG. 1 illustrates a schematic illustrating the components within the cross-channel architecture.

FIG. 1 illustrates the data flow architecture and data format for an image path architecture for performing cost-effective cross-channel image processing using an interleaved data flow 100. Interleaving is a method of transporting data packets by dividing the data into smaller bits and then rearranging them so that once contiguous data is now spaced further apart into a non-continuous stream. Data packets or segments are then re-assembled when the data is sent to an output destination such as a printer. Interleaving enables a system to re-request a part of the data that was not transmitted in full, which improves the efficiency of the error detection and correction codes. Interleaving is a means by which data may be arranged in a non-contiguous manner in order to increase the data access performance and is typically used in error-correction coding, particularly within data transmission. Interleaving may also be used to adjust the timing differences between when a computer is ready to transfer data, and when that data is actually arriving at the drive head to be read. Interleaving may also be used in computer memory allocation and for multiplexing of several input data over shared media in order to resolve quality of service and latency issues. In streaming media applications, interleaving enables quasi-simultaneous reception of input streams, such as video and audio. Interleaving may also be employed to transmit a plurality of input color pixel signals such as cyan, magenta, yellow and black to a common output printing apparatus.

Primary or secondary separations that represent distinct color components of abstract color spaces that may be standard or non-standard, well defined or varying due to physical system variations, or represent distinct color components of color spaces characteristic of the physical marking or display technology colorants.

Input values of the given colorants 110, in the present embodiment comprise cyan 112, magenta 114, yellow 116, black 118. The method utilizes pixel data for that colorant at its nominal (full) resolution 130 such as cyan 132, magenta 134, yellow 136, black 138. The pixel data 120 is also sent to be sub-sampled for colorants for cyan 122, magenta 124, yellow 126, and black 128 utilized at a lowered resolution.

Sub-sampling is a means whereby a lower resolution signal is generated by extracting only a portion of a sample of a nominal full value signal. Such a low resolution sub-sample is obtained for each colorant by calculating averages of N×N windows in the image and it has been found satisfactorily to use N=8, but it will be understood that other values can be employed depending upon the application. The low resolution sub-sample may also be obtained by regular sub-sampling picking one pixel value out of the set of N×N pixels in the window, which is also known as decimation. Alternatively, averaging with weighted values prior to sampling may be employed to derive the sub-samples. Other order-statistic methods lay be used to derive the sub-samples, such as using the maximum value, median value, or minimum value within the N×N window as the sub-sample value. Another alternative is to use the value derived as a result of other operations such as JPEG compression which calculates the DC value of every 8×8 pixel window. Thus, if the printing engine is processing the cyan value C at full resolution as the primary colorant driving a marking engine, it will have averages for M and Y as secondary color separations across the corresponding N×N window in which the C pixel is located. Thus, if the full resolution pixel C has a spatial location in an 8×8 window, the print engine will have available the spatially averaged N value of the block going from row 1 to row 8 and from column 1 to column 8, and correspondingly for the averages of the Y sub-sample pixel values.

Lower bandwidth separations are achieved through reduction in information content in some dimension, such as reduction in numeric precision or any other method of reducing information content for the purpose of reducing data size.

Color-corrected pixel output values for cyan can be obtained by inputting cyan 132 pixel values at nominal resolution into a multi-dimensional LUT, and the values for the other color dimensions magenta 124, yellow 126, and black 128 input using sub-sampled values 120, such as JPEG DC coefficients, JPEG2000 sub-bands, or DRI pixel values (Display Resolution Image, which are generated as part of a multi-mode compression practice). The present application may also be used as a halftoning method that employs the sub-sampled cross-channel architecture.

It can be seen that input pixel colorant 120 values (CMYK or others) are input to a sub-sampler 140. The sub-sampler 140 would preferably operate in a simple independent channel manner, but it could take into account all channels when sub-sampling. For example, the values for any needed sub-sampled channel can be provided using JPEG DC coefficients, DRI pixel values (Display Resolution Image), or JPEG2000 wavelet sub-bands.

The JPEG2000 is a common image compression format, as a source of sub-sampled image data. JPEG2000 transforms the image into a set of two dimensional sub-band signals, each representing the activity of the image in various frequency bands at various spatial resolutions. Each successive decomposition level of the sub-bands has approximately half the horizontal and half the vertical resolution of the previous level. A reverse decomposition module within the sub-sampler reverses as many decomposition steps as necessary to obtain a low resolution version of the original image with resolution equal to the desired sub-sample spatial resolution utilized in the multi-dimensional mappings.

Nominal resolution pixel data 132, 134, 136, 138 and sub-sampled resolution data of cyan 152, magenta 154, yellow 156, black 158 pixel data is input to cross-channel processors, and each processor outputs 170 the modified pixel value for a particular colorant 172, 174, 176, 178. The multi-channel processing may not need each and every one of channels shown.

Performing cross-channel operations in the area of real-time color correction and real-time color uniformity correction requires all pixel separations to be synchronized in both time and space. Separation of color pixel channels achieves higher aggregate bandwidths and isolate the channels in space because the color pixels for different separations likely flow through different hardware modules. The multiple links are also leveraged to stagger the flows in time, matching the print engine characteristic of marking separations sequentially. Bringing the separations back into alignment in both time and space in the print engine may be achieved by sending all separations redundantly at the times required by each of the colorant markers. Alignment of separations may also be achieved by incorporating large buffers in the print engine so that all separations redundantly at the times required by each of the colorant markers. It may also be achieved by incorporating large buffers in the print engine so that all separations can be received once and played out repetitively as needed by each colorant marker.

The key characteristic of the secondary separations is that they require less data to be transmitted and stored than the primary separations. This is accomplished by discarding information that the downstream portion of the system can do without. The present embodiments describe trading off spatial resolution to achieve the required reduction in separation size, however information in other dimensions could be traded off in addition to or instead of spatial resolution. For example optical density accuracy could be traded off by reducing the number of bits used to encode the video level of each pixel. Well known or proprietary data or image compression techniques could also be applied to the original separation data to reduce its size, however any compression algorithm will inherently be able to achieve a smaller size if applied after the information removal operation disclosed here.

The isolation of the separation channels precludes any cross-channel processing such as real-time color correction and real-time color uniformity correction. Such methods would improve the engine-to-engine consistency of color for tightly integrated serial printing (TISP) and tightly integrated parallel printing (TIPP) architectures and improve the color uniformity for Intermediate Belt Transfer (IBT) architectures. Additionally, the ability to perform cross-channel processing would allow enhanced halftoning operations, such as vector halftoning.

An efficient data flow and data format has the following features. High 130, and low resolution 150, image separations are generated in a DFE. The DFE distributes the data for each writing channel according to the time it is needed. The sub-sampled data representations for cyan 152, magenta 154, yellow 156, and black 158 for cross-channels sent are interleaved with the full resolution image data representation through multi-channel processing. Each color has an individual multi-channel processor such as cyan 162, magenta 164, yellow 166, and black 168. Interleaving avoids a need to buffer large amounts of image data to enable concurrent access. Within every interleave unit, the low resolution secondary channels are sent first to minimize the buffering required given the interleave scheme, enabling the high resolution data to be processed into output pixel values 170 for each color such as pixels for cyan 172, magenta 174, yellow 176, and black 178. These pixel values 170 are printed as soon as received without buffering. The data flow can be a natural extension of a multi-mode compression practice, where the nominal resolution data is sent in 8-raster bands, and the novel addition sends cross-channel sub-samples of those bands.

Figure 2:
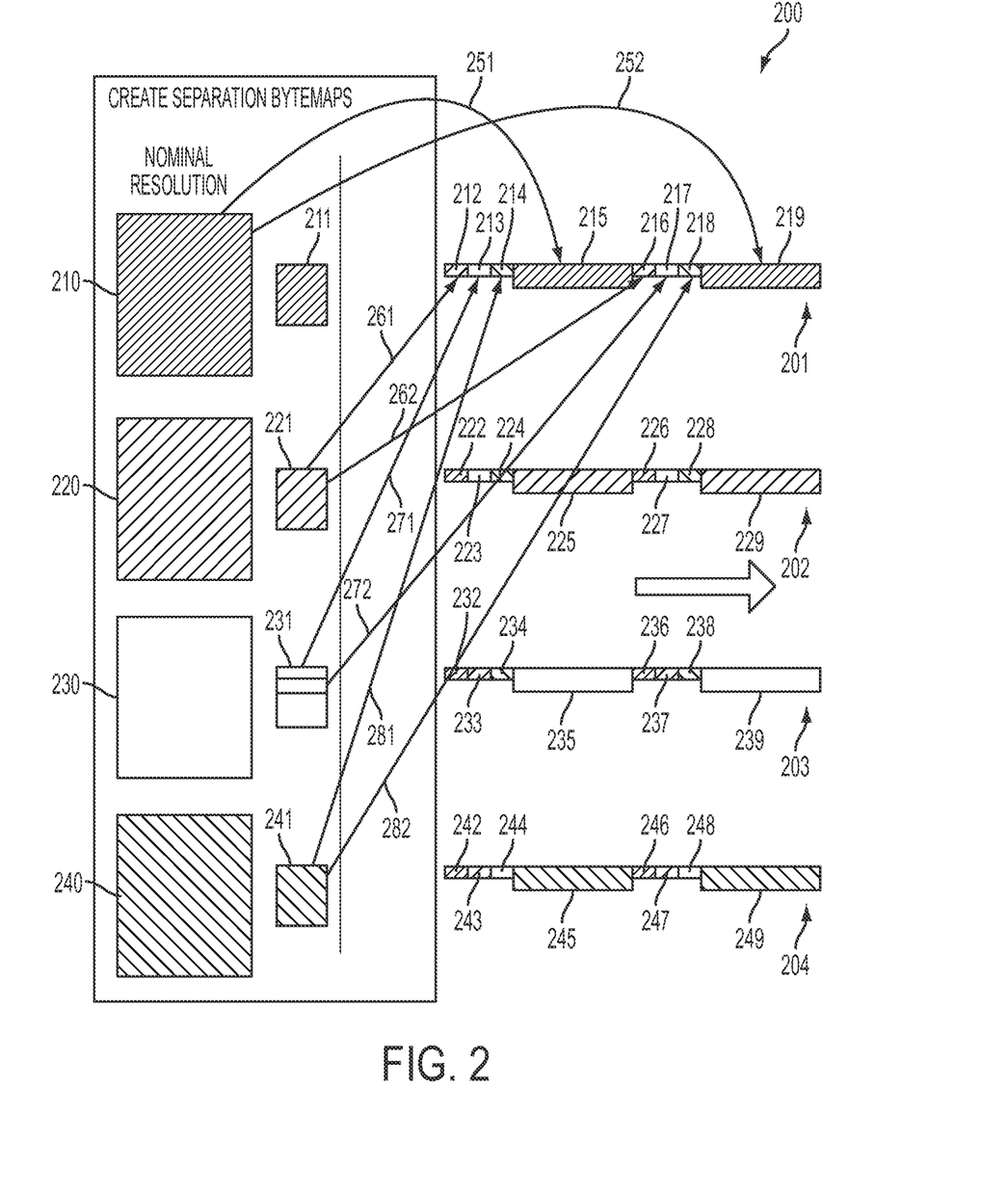
FIG. 2 illustrates the digital front end interleaving of the nominal full resolution colors with the sub-sampled lower resolution colors.

FIG. 2 illustrates one embodiment of the current application. The interleaving is shown 200 as providing the cross-channel sub-samples for a group of full resolution full length rasters prior to providing the full resolution rasters. Other embodiments could vary the order of the interleaved data or send partial length raster lines. Arrows are shown to indicate DFE source data for processing and printing the cyan separation. Data Extraction and Alignment then occurs by extracting image data for each imaging station in alignment for that station.

Communication channels carry the flow of interleaved image separation data wherein the interleaved separation data is divided into segments and the segments are populated with portions of the various separations such that information that needs to be processed together by the recipient are transmitted in the same segment, eliminating the need for buffers spanning large areas of the image.

The separation data within the segments is ordered so that the reduced bandwidth, low information, secondary separations which are inherently smaller are sent first, minimizing the size of the buffering required to delay and align these first separations with separations sent later.

A separation is composed of a normal resolution data 210, 220, 230, 240 from the incorporated colors along with the same incorporated colors sampled as low resolution data 211, 221, 231, 241. Each separation for a given color will incorporate a normal resolution of that particular color and the low resolution data from all other colors.

Thus, the cyan separation 201 comprises of normal resolution cyan 210 along samples of low resolution data 221, 231 and 241 from the other colors. Cyan will not incorporate cyan low resolution data 211. Thus the cyan separation 201 will use cyan nominal resolution 210 sent via 251, 252 to 215, 219, low resolution magenta 221 sent via 261, 262 to 212, 216, low resolution yellow data 231 sent via 271, 272 to 213, 217, and low resolution black 241 sent via 281, 282 to 214, 218.

Further, the magenta separation 202 comprises normal resolution magenta 220 along samples of low resolution data 211, 231 and 241 from the other colors. Magenta will not incorporate magenta low resolution data 221. Thus the magenta separation 202 will use magenta nominal resolution 220 sent to 225, 229, low resolution cyan 211, sent to 222, 226, low resolution yellow data 231 sent as 223, 237, and low resolution black 241 sent as 234, 238.

Further, the yellow separation 203 comprises of normal resolution yellow 230 along samples of low resolution data 211, 221 and 241 from the other colors. The yellow separation 203 will not incorporate yellow low resolution data 231. Thus the yellow separation 203 will use yellow nominal resolution 230 sent to 235, 239, low resolution cyan 211, sent to 232, 236, low resolution magenta data 221 sent to 233, 237, and low resolution black 241 sent to 234, 238.

Finally, the black separation 204 comprises of normal resolution black 240 along samples of low resolution data 211, 221 and 231 from the other colors. The black separation will not incorporate black low resolution data 241. Thus the black separation 204 will use black nominal resolution 240 sent to 245, 249, low resolution cyan 211 sent to 242, 246, low resolution magenta data 221 sent to 243, 247, and low resolution yellow 240 sent as 244, 248.

Image data for processing and printing other separations is likely to be pulled from different depths within the image due to the spatial separation of the imaging stations. In practice, not all cross-channel data may be needed for processing a given channel. The unnecessary data could be omitted or replaced with some null value. Also, channels in addition to CMYK such as but not limited to green, orange, white may be used within the present invention. The embodiments actually take on increasing value as the number of channels increase because the sub-sampling decreases the bandwidth, which increases with additional channels.

The present application employs interleaving and sub-channeling resulting in only a very modest increase in communication channel bandwidth, the amount of data that may pass to the print engine over a certain time, and buffering within memory.

The input color data 110 may enter the system through use of a keyboard, Internet or network connection, retrieval from storage medium, computer memory retrieval and the like. The data once retrieved or received may be stored in a computer memory and or a database system therein. The data processing and transformation may take place on a computer operable processor with input and output functionality.

The multiplexer sub-sampler 140 arrangement uses a computer operable computer processor in order to perform the mathematical operations and computations associated with creating byte maps from color pixels. Input 110 is received through input from a scanner, digital memory, real time video capture, photography, and the like. The input data 110 and the sub-sampled data 150 may be stored in a computer memory organized in a database format. The data after being transmitted in an interleaved format is converted into pixels and may be output to a video terminal, printed to paper or any other surface via a laser printer, copier or any other comparable medium.

Figure 3:
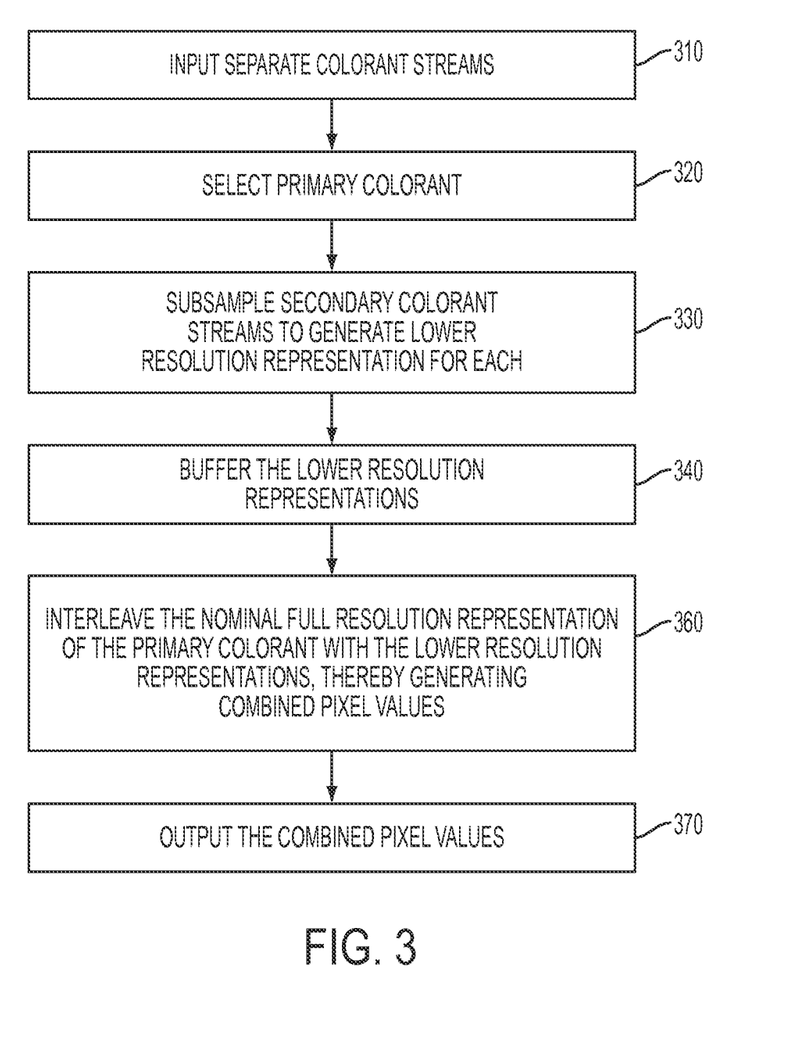
FIG. 3 illustrates a step-by-step workflow of the method.

FIG. 3 illustrates the method 300. Input separate colorant streams 310 are entered into the apparatus. An analysis is performed in order to determine which color signal is the primary driving signal for a corresponding marking engine and this color is deemed to be the selected one primary colorant 320. The other colors that are not selected as the primary color are then sub-sampled to generate a lower resolution representation for each of them. The lower resolution bytemaps are then buffered as received 340. Then the nominal full resolution representation is interleaved with the sub-sampled lower resolution representation 360. Finally, the output the combined pixel values 370.

Figure 4:
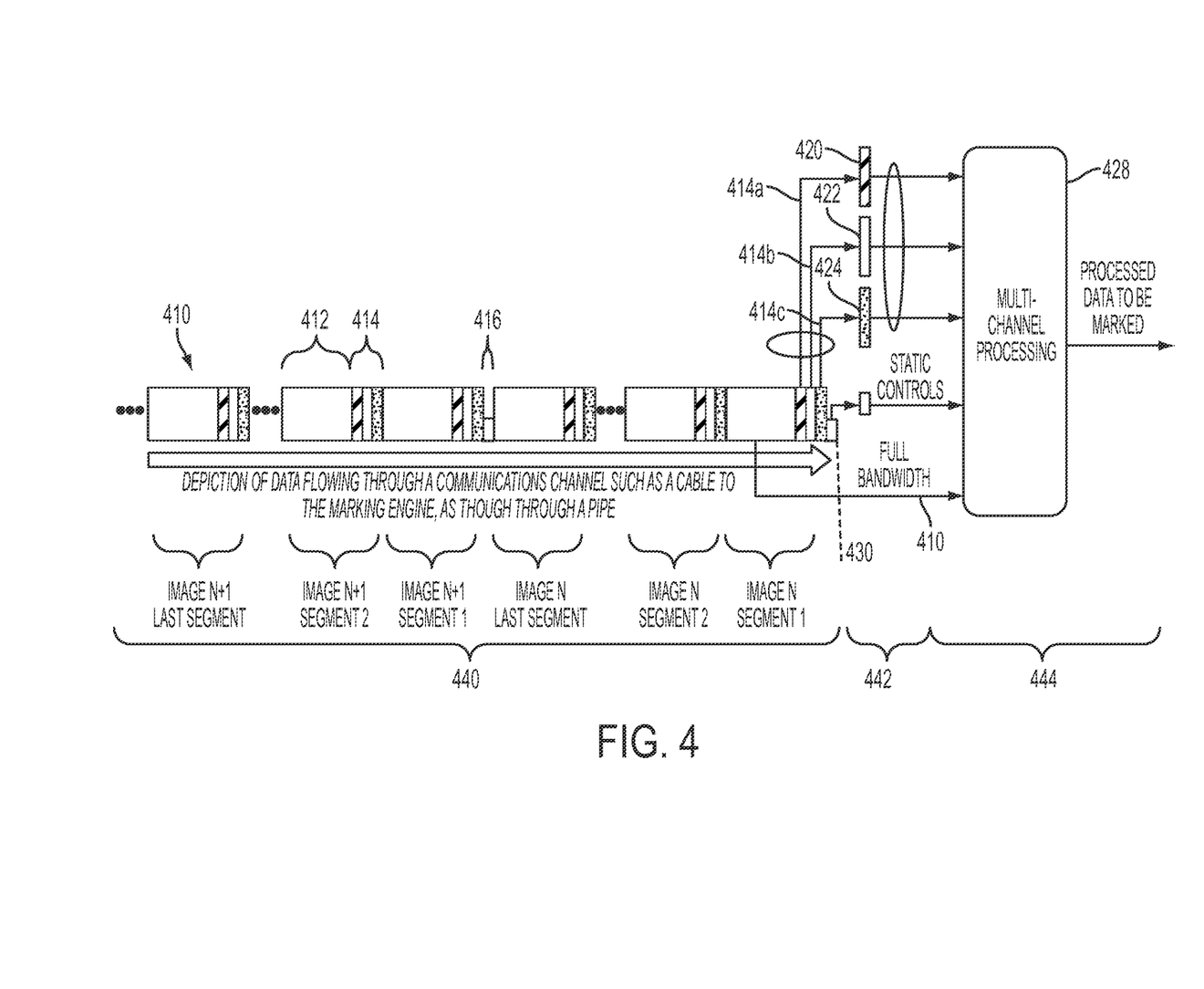
FIG. 4 illustrates a mixed resolution interleaved cross-channel data flow and format.

With reference to FIG. 4, an exemplary hardware embodiment of a mixed resolution interleaved cross-channel data flow and format is illustrated. The embodiment shows the communication and processing of images that have been separated into segments to reduce buffer storage. As noted above, segmenting is not required by the present embodiments, but the embodiments are compatible with the segmenting of images. Segment size can be any size that is convenient or synergistic with other parts of the system but must be a multiple of the sub-sample factor for the full resolution data. In the subject example, segments of eight scan lines would be synergistic with JPEG compression. If images are not segmented, then in this illustration there would be only one "segment" encompassing the entire image. Similarly, the "image control" information could exist per segment, per image, or per group of images, driven by the needs of the larger system.

FIG. 4 schematically depicts the data flowing through a communication channel such as a cable to the marking engine, as though through a pipe. The data is comprised of a plurality of image segments 410, each image segment being comprised of the full resolution data to be marked 412 and the sub-sampled color channels 414. A plurality of image segments are associated with a particular image N, where segment 1, segment 2, and thereafter are serially aligned bands up until the last segment as the data information for image N. In between image N and image N+1 is image control information 416, which information can typically identify which channels are present. Before processing by the multi-channel processor 428, it can be seen that the full resolution bandwidth data 410 is directly communicated in real-time to processor 428. The sub-sampled color channels are sent as low duty cycle bursts at the full communication channel data rate to buffers 420, 422, 424 for storing the sub-sampled color channels 414a, 414b, 414c, respectively. The burst data rate and duty cycle for the communication of such data is dependent on downstream processing requirements. Image control information 430 is also buffered for appropriate communication of static control information to the processor 428. The control information 430 is included in each segment or in periodic or dynamically determined segments enabling the interleaving, ordering, and encoding to be different for each segment.

The buffers store the data of secondary separations that are received first so that they can be provided to the calculation block 428 in the receiving system synchronized with the primary separations as they arrive. The primary or secondary information separations that are not used for a given job are omitted, replaced by nulls, or transmitted with uncontrolled data values that will be ignored by the receiving system.

Communication channels carrying the flow of interleaved image separations wherein separation data with the segments is ordered so that the full bandwidth, high information, primary separations which are inherently larger are sent last, enabling them to be processed as soon as they are received without buffering.

Thus, as can be seen in FIG. 4, the communication channels conveying the necessary image data are communicated serially 440 to a marking engine. The sub-sampled color channels are fully received and buffered 442 before the full resolution data to be marked arrives at processor 428. The full resolution data is processed 444 in real-time as it is received without buffering, playing the sub-sampled channels out of their buffers as required to provide context for the calculations.

The primary and secondary separations each describe the image with respect to one component of the color space used to describe the image. Commonly Cyan, Yellow, Magenta, and Black (CMYK) are used, but advanced high-fidelity printing systems may also include other colors such as Orange, Violet, or Green, and systems using additive color such as computer displays may used Red, Green, and Blue. Systems may use a system dependent color space.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

What is claimed is:

1. A system of receiving pixel data values and transforming the data values into an interleaved cross-channel data flow printer output comprising:
    an image processor for receiving separate streams of input color pixels; and
    a data extraction and alignment component for receiving and processing the input color pixels comprising:
        a full nominal resolution representation of a color separation;
        a sub-sampler for receiving as input the full nominal resolution representation and for producing as output a lower resolution representation of a secondary separation;
        a plurality of multi-channel processors which receive and interleave the full nominal resolution representation with a lower resolution representation, and
        a buffer for storing the lower resolution representation,
        wherein the cross-channel data not used or is unnecessary is omitted or replaced with null values.

2. The system of claim 1, wherein the streams of input and output color pixels comprise at least one of cyan, magenta, yellow and black, orange, green, violet, light cyan, light magenta, gray, dark yellow, white and clear.

3. The system of claim 1, wherein the full resolution representation is processed and printed as received.

4. The system of claim 1, wherein the sub-sampled lower resolution values are at least one of JPEG DC coefficients, JPEG2000 sub-bands, and Display Resolution Image Pixels.

5. A method of transforming pixel data values into an interleaved cross-channel data flow comprising:
    inputting a plurality of separate colorant streams of input pixels into a computer operable system for storage on a computer operable database;
    selecting one stream of color pixel data as a primary driver signal for a marking engine used in the input colorant stream;
    generating a lower resolution sub-sampled representation for the colors other than the selected primary color;
    processing the primary color stream at nominal full resolution;
    interleaving the nominal full resolution color with the lower resolution sub-sampled colors to create an interleaved data flow;
    transmitting the interleaved data flow and buffering the lower resolution representations;
    converting the lower resolution representations and primary color data nominal data into color pixels; and
    outputting the converted pixel values to the marking engine,
    wherein the low resolution data is transmitted first in the interleaved data flow for temporary buffering and the high resolution data is processed as received.

6. The method of claim 5, wherein the input pixel values are colorants from the group of cyan, magenta, yellow, black, orange, green, violet, light cyan, light magenta, gray, dark yellow, white and clear.

7. The method of claim 5, wherein the sub-sampled values are at least one of JPEG DC coefficients, JPEG2000 sub-bands, and DRI Pixels.

8. The method of claim 5, wherein the nominal resolution data is sent in 8-raster bands.

9. The method of claim 5, wherein the cross-channel data not used is omitted or replaced with null values.

10. The method of claim 5, wherein the output colors comprise cyan, magenta, yellow and black pixel values.

11. A system for transforming pixel data values into an interleaved cross-channel data flow printer output comprising:
    computer operable input for inputting a plurality of individual colorant streams of input pixel values from an image processor;
    selecting a primary color stream representation for a color driving a marking engine;
    a sub-sampler for sub-sampling secondary color stream representations and producing a lower resolution representation therefor; and,
    a multiplexer for combining the primary representation with the low resolution representation to create output pixel values,
    wherein one or more of a plurality of primary separations are processed without using one or several or any of the other separations.

12. The system of claim 11, wherein the individual color streams input are from the group of colors comprising cyan, magenta, yellow, black, orange, green, violet, light cyan, light magenta, gray, dark yellow, white and clear.

13. The system of claim 11, wherein the interleaved data flow comprise (N) input colors, one full nominal resolution representation, and (N−1) sub-sampled low resolution representation.

14. The system of claim 13, wherein the sub-sampler may employ a lookup table of pixel values to match a color pixel with a sub-sampled pixel.

15. The system of claim 11, wherein the sub-sampled values are at least one of JPEG DC coefficients, JPEG2000 sub-bands, and DRI Pixels.

16. The system of claim 11, wherein the nominal resolution data is sent in 8-raster bands.

17. The system of claim 11, wherein the cross-channel data not used is omitted or replaced with null values.

18. The system of claim 11, wherein image control information corresponding to the image flow is associated with the representation in periodic or dynamically determined representations for consumption by a marking engine processor.

19. The system of claim 11 wherein a plurality of primary separations are interleaved on a fine grained basis such as a pixel or a short run of pixels for concurrent reception and processing without buffering on a receiving system.

20. The system of claim 11, wherein a plurality of secondary separations are interleaved on a fine grained basis such as a pixel or a short run of pixels so that they can be buffered and played out for synchronized processing with incoming primary separations with a single buffer.

21. The system of claim 11, wherein at least one of a plurality of primary information separations or at least one of a plurality of secondary information separations that are not used for a given job are omitted, replaced by nulls, or transmitted with uncontrolled data values and ignored by a receiving system.

22. The system of claim 11, wherein image control information is included in each segment or in periodic or dynamically determined segments for selective enabling differences in the interleaving, ordering, and encoding for each segment.

* * * * *